US007092368B2

(12) United States Patent
Kumar et al.

(10) Patent No.: US 7,092,368 B2
(45) Date of Patent: Aug. 15, 2006

(54) REDUCTION OF DEVICE DISCOVERY DELAYS IN FREQUENCY HOPPING-BASED AD-HOC NETWORKS

(75) Inventors: Apurva Kumar, New Delhi (IN); Rajeev Shorey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 09/785,577

(22) Filed: Feb. 16, 2001

(65) Prior Publication Data

US 2004/0037323 A1    Feb. 26, 2004

(51) Int. Cl.
*H04Q 7/00* (2006.01)
*H04Q 7/28* (2006.01)
*H04L 27/00* (2006.01)
*H04B 7/00* (2006.01)
*H04L 27/06* (2006.01)

(52) U.S. Cl. .................. 370/328; 370/338; 375/259; 375/344; 455/517

(58) Field of Classification Search ............... 370/480, 370/328, 338; 375/132, 133, 136, 259, 344, 375/356; 455/41.2, 517, 518, 519
See application file for complete search history.

(56) References Cited

U.S. PATENT DOCUMENTS

| 5,940,431 | A * | 8/1999 | Haartsen et al. ........... 375/131 |
| 6,389,057 | B1 * | 5/2002 | Haartsen .................. 375/132 |
| 6,718,395 | B1 * | 4/2004 | Ziegler .................... 709/248 |
| 6,754,250 | B1 * | 6/2004 | Haartsen .................. 375/132 |
| 6,950,645 | B1 * | 9/2005 | Kammer et al. ........... 455/343.1 |
| 2002/0071477 | A1 * | 6/2002 | Orava ........................ 375/132 |
| 2003/0012173 | A1 * | 1/2003 | Rune ......................... 370/344 |
| 2003/0096576 | A1 * | 5/2003 | Salonidis et al. ........... 455/41 |

FOREIGN PATENT DOCUMENTS

| JP | 10-107697 | 4/1998 |
| JP | 2000-269935 | 9/2000 |

OTHER PUBLICATIONS

Jaap C Haartsen, "The Bluetooth Radio System", IEEE Personal Communications Magazine, Feb. 2000, pp. 28-36.
Bluetooth Specification v.1.0.B—Baseband Specification, pp. 41-42, Nov. 29, 1999.
Bluetooth Specification—Core v1.0A, Baseband Specification, pp. 95-139, Jul. 24, 1999.

* cited by examiner

*Primary Examiner*—Chau Nguyen
*Assistant Examiner*—Hong Sol Cho
(74) *Attorney, Agent, or Firm*—Gibb I.P. Law Firm, LLC; Pete Tennent, Esq.

(57) ABSTRACT

A method for reducing device discovery delays in frequency hopping based ad-hoc networks is disclosed. According to the method, an activity being performed is periodically interrupted to scan for inquiry messages from other devices for a pre-determined period time period. Processing of a received inquiry message, in accordance with normal procedures applicable to the particular frequency hopping based ad-hoc network, occurs after expiry of a random time period. At the end of the predetermined time period, the original activity is returned to. A device for use in frequency hopping based ad-hoc networks that embodies the described method and a computer program product for such a device, are also disclosed.

21 Claims, 14 Drawing Sheets

REDUCTION OF DEVICE DISCOVERY DELAYS IN FREQUENCY HOPPING-BASED AD-HOC NETWORKS

FIELD OF THE INVENTION

This invention relates to frequency hopping-based ad-hoc networks, such as may be implemented under the Bluetooth™ defacto standard, by which wireless devices can communicate. The invention is related particularly to the process of device discovery, and to reducing delays in such processes.

BACKGROUND

In recent times there has been a trend in wireless communications towards ad-hoc networks where telecommunications and computing devices (such as PCs, pagers and mobile phones) are intended to be freed from fixed or subscription-based cellular networks so as to have flexible operability and modality.

One such example described on the Bluetooth™ web site (http:\\bluetooth.com) is the 'three-in-one', which can operate in the home as a cordless phone, outside the home as a mobile (cellular) phone, and as a two-way walkie talkie device. This illustrates the ad-hoc nature of the radio links that may be formed.

Although the following discussion focuses on Bluetooth™, it will be appreciated that the invention has general application to other forms of frequency hopping-based ad-hoc networks.

Reference can be made to the Bluetooth™ Core Specification Volume 1, Version 1.0B (available from the noted web site).

Bluetooth™ technology allows for the formation of networks called piconets and interconnection of such networks, called scatternets without the involvement of a central infrastructure, in an ad-hoc fashion. This is made possible using distributed algorithms for inquiry and paging. While device discovery in this document refers to the process of obtaining Bluetooth™ addresses and clocks of neighboring devices using inquiry procedures, paging is used to setup a connection with a particular Bluetooth™ device.

The Bluetooth™ physical layer uses frequency hopping which conforms to FCC regulations for the 2.4 GHz ISM band. It uses a 79 hop system with each hop occupying 1 MHz. These restrictions have implications on the device discovery process. One implication is: when a device wakes up to scan for inquiry messages, it cannot do so at a fixed dedicated frequency. Instead, the wake up frequency could be any of the 32 frequencies in the inquiry hopping sequence. The actual frequency used depends upon the clock of the scanning device, which is not known to the inquirer. Moreover, since the onus of finding a new device is deliberately kept with the inquirer, the scanning device does not do continuous scanning. Hence, in the inquiry procedure there is uncertainty in both time and frequency at which the scanning device(s) might be listening.

The Baseband Specifications of the Bluetooth™ Version 1.0 specifications specify device discovery procedures (henceforth called the BT algorithms) using inquiry and inquiry scan in which the inquirer has no information about the address or clock of the devices around it. The procedures work well when there are no simultaneous inquirers. The performance is difficult to predict in the case of multiple simultaneous inquirers.

Due to the above factors, the inquiry procedure becomes time and energy consuming for the device doing inquiry. Even in an error-free environment, it can take 10.24 sec for an inquiring device to collect all responses. These delays could be bottlenecks in setting up individual connections and ad-hoc networks. Many application scenarios envisioned for Bluetooth™ require a large number of terminals to operate in overlapping areas. Under such conditions even the average delays are increased, prohibiting the use of the technology for these applications. Some modifications to the device discovery algorithms are thus required which can enable such applications by a reduction of these delays.

Due to the interaction of several devices during inquiry, the problem of finding the delay distribution or even average delays is not easily tractable. These delays depend upon the number of devices participating in an inquiry procedure, the number of inquiring devices, the bandwidth reserved for inquiry, the number of responses required from an inquiry, etc.

It is an object of the invention to provide a device discovery procedure which results in a faster exchange of inquiry responses than in the prior art, in a system having multiple simultaneous inquirers, yet maintaining performance otherwise.

SUMMARY OF THE INVENTION

According to a first aspect of the present invention, a method for reducing device discovery delays in frequency hopping based ad-hoc networks is provided. The method includes the steps of:

periodically interrupting an activity being executed by a device to scan, for a pre-determined time period, for inquiry messages from other devices;

returning to continue the activity for a random time period on receipt of an inquiry message from another device and, upon expiry of the random time period, processing the inquiry message in accordance with normal procedures applicable to the particular frequency hopping based ad-hoc network; and returning to continue the activity on expiry of the pre-determined time period.

According to another aspect of the present invention, a device for use in frequency hopping based ad-hoc networks is provided. The device includes:

means for periodically interrupting an activity being executed by the device to scan, for a pre-determined time period, for inquiry messages from other devices;

means for returning to continue the activity for a random time period on receipt of an inquiry message from another device and, upon expiry of the random time period, for processing the inquiry message in accordance with normal procedures applicable to the particular frequency hopping based ad-hoc network; and means for returning to continue the activity on expiry of the pre-determined time period.

According to a further aspect of the present invention, a computer program product incorporating a computer readable medium having a computer program recorded therein for use in devices for frequency hopping based ad-hoc networks is provided. The computer program product includes:

computer program code means for periodically interrupting an activity being executed by the device to scan, for a pre-determined time period, for inquiry messages from other devices;

computer program code means for returning to continue the activity for a random time period on receipt of an inquiry message from another device and, upon expiry of the random time period, for processing the inquiry message in accordance with normal procedures applicable to the particular frequency hopping based ad-hoc network; and computer program code means for returning to continue the activity on expiry of the pre-determined time period.

In accordance with a described embodiment of the present invention, the frequency hopping based ad-hoc network is implemented under the Bluetooth™ defacto standard and the interrupted activity is one of device discovery. The periodic interruption to scan for inquiry messages from other devices preferably occurs at least once every 2.56 seconds and the random time period to continue an interrupted activity, before processing a received inquiry message, is preferably less than or equal to 1.28 seconds.

BRIEF DESCRIPTION OF THE DRAWINGS

Embodiments of the invention will now be described with reference to the accompanying drawings, in which.

DETAILED DESCRIPTION OF PREFERRED EMBODIMENTS INCLUDING BEST MODE

Definitions

Figure 1:
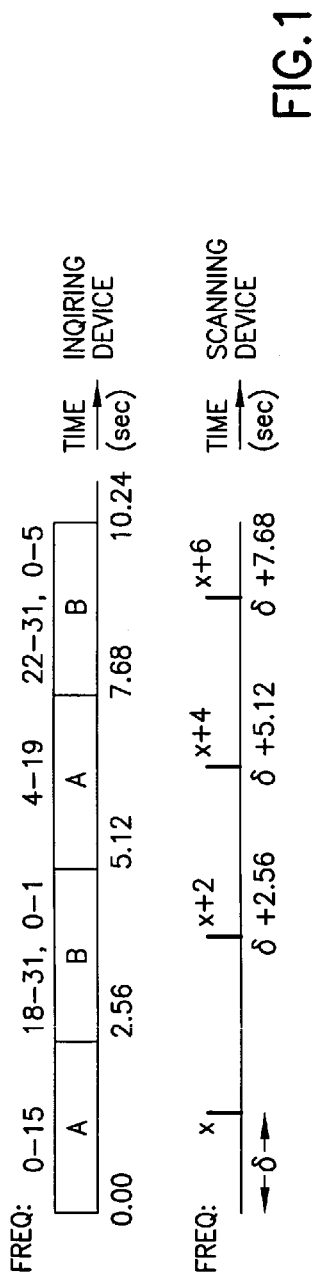
FIG. 1 is a timeline relating to the Bluetooth™ inquiry procedure.

Inquiry procedure: The procedure carried out by a device to discover other devices.

Inquiry Scan procedure: The procedure carried out by devices which allow themselves to be discovered.

Device discovery procedure: The combination of the above two procedures carried out in a distributed fashion.

GIAC: General Inquiry Access Code is an inquiry access code common to all devices. All devices that wish to reply to inquiry will reply to an ID packet containing the GIAC.

DIAC: Dedicated Inquiry Access Code is common for a dedicated group of Bluetooth™ units that share a common characteristic.

Inquiry Hopping Sequence: 32 unique wakeup frequencies distributed over 79 MHz with a period length of 32. GIAC is used to derive this sequence.

Inquiry Response Hopping Sequence: 32 unique response frequencies which are in one-to-one correspondence to the current inquiry hopping sequence. GIAC is used to derive this sequence.

Inquiry delay: The time elapsed between a device starting an inquiry procedure and the earlier of the following two events: Max_responses (maximum number of responses received) or Inquiry Timeout.

Device discovery delay: The average delay in an ad-hoc environment for a device to discover any other device. The devices in the environment may or may not already be part of a network. The device discovery delay in an environment with 'n' devices is given by:

$$\left(\frac{1}{n(n-1)}\right)\sum_{a=1}^{n}\sum_{b=1,a\neq b}^{b=n} d_{ab}$$

where $d_{ab}$ is the average delay for device 'a' to discover device 'b'.

In an environment with a large number of identical devices, both device discovery and inquiry delays can be related to the number of responses received per unit time. Let there be N responses in time T in such an environment of 'n' devices where the fraction of time each device spends doing inquiry is 'f'. Then, at any time, there are an average of nf inquiring devices. If no inquiry timeouts occur then the average inquiry delay is, Max_responses x (Tnf/N) while the average device discovery delay is (Tnf/N)×(n/2). Thus an increase in the number of responses per unit time (N/T) is sufficient to ensure that average delays are reduced.

Piconet: A point to multipoint connection between a master and upto 7 active slaves. This is the basic network unit in Bluetooth™. All the devices in a piconet use the same hopping sequence called Channel Hopping Sequence which is derived from the master device's clock.

Scatternet: A network of piconets formed by connecting two or more piconets by means of bridge devices. Each piconet uses a different hopping sequence.

Parameters used in the inquiry procedure $T_{winqscan}$=Inquiry scan window=18 slots (1 slot=625 μsec)

$T_{inqscan}$=Time between start of consecutive inquiry scan windows=2.56 sec.

inquiryTO=maximum inquiry duration.

inqrespTO=maximum time a unit can be in Inquiry Response mode.

Bluetooth™(BT) Inquiry Procedure

The inquiry procedure used for device discovery in Bluetooth™ can be briefly described with reference to FIG. 1.

The upper timeline shows the inquiring device. The 32 inquiry hop frequencies are divided into 2 trains of 16 frequencies each. The frequencies in a train are determined by the inquirer's clock. The 16 frequencies in the first train are repeated 256 times before the second train is started. Every even slot, 2 frequencies are sent and every odd slot, responses are awaited from devices scanning at these frequencies.

As seen from the upper timeline of FIG. 1, train B is not exactly complementary to train A, as there is an overlap of two frequencies. So, if the frequencies in the A train are enumerated as 0–15, the frequencies in the B train are enumerated as 18–31, 0–1. Thus frequencies 0 and 1 overlap. The overlapping is done because the scanning frequency changes by two between two consecutive inquiry scans as is explained below.

The second timeline shows the scanning device. There is an uncertainty in time, δ as well as frequency X which are not known to the inquirer. The scanning device scans for a window of 18 slots every 2.56 sec. The phase in the inquiry hopping sequence during scanning is determined by $CLKN_{16-12}$, i.e., bits 12–16 of the native clock of the scanning device. This changes every 1.28 sec, and since scanning takes place every 2.56 sec, the scanning device scans at alternate frequencies in the hopping sequence as shown in the figure by X, X+2, X+4 and X+6.

In the absence of any errors, the scanning device will receive an inquiry packet by the time the second inquiry scan window is over. However, the scanning device does not send a response in the very next slot, but returns to the previous state (STANDBY or CONNECTION), waits for a random period of maximum 1023 slots and returns to Inquiry Scan and listens at the same frequency. When an inquiry packet is again received, the scanning device sends an FHS packet containing its address and clock information and thus the means of obtaining the Frequency Hopping Sequence (FHS) which is required for paging the device. In this procedure, even if the environment is error-free and collisions of FHS packets are neglected, discovery delays could still be as high as 10.24 sec. However when there are more than one inquiring devices, the delays would be still higher and difficult to predict.

The maximum device discovery delay for any two devices can be as high as 10.24 sec in an error-free environment with a single inquirer. The problems are exaggerated in an environment with multiple inquirers as follows:
1. Devices in the 'inquiry' state become unavailable for discovery by other devices for the inquiry delay period. This results in an increase in average inquiry delays for all the inquiring devices.
2. Connection setup delays between two devices can be reduced if both devices have a chance of discovering each other. When one of the device goes into inquiry, discovery of this device by the other device is impossible for a long time.
3. Devices doing inquiry simultaneously cannot discover each other for as long as their 'inquiry' states overlap. This causes the device discovery delays to increase.

From the above it is clear that the BT algorithm does not work very well when there are more than one inquirers. However, any improvement should take into account the following factors:
1. The FCC regulations which apply for frequency hopping in the 2.4 GHz ISM band.
2. The ON duty cycle for devices in idle mode (STANDBY) should not be increased. This means that the inquiry scan window should not be increased beyond 18 slots. Thus, the inquiry hopping sequence should be divided into 2 trains as in the specifications.
3. The frequency hopping kernel and the control words used for different states in the frequency hopping kernel should preferably remain unchanged. 4. In reducing average delays, the maximum delay should not become unbounded for specific cases. For instance, the maximum device discovery delay in an error-free environment with a single inquirer should not be more than 10.24 sec.

In view of the constraints (1) and (2), the worst case delays cannot easily be improved without major changes in the inquiry procedures themselves. A means of improving average delays by a change in the device discovery algorithm which achieves improved performance by switching of states, is proposed. The device discovery algorithm sits at the Link Manager.

Algorithm for Reduction of Delays

The basic principle of the algorithm is:
1. All devices which are taking part in device discovery should perform inquiry scan at least once every 2.56 sec, irrespective of which state the devices are in between inquiry scans.
2. A consequence of (1) is that a device in the inquiry state might have to interrupt inquiry since the inquiry state will generally last for more than 2.56 sec.

The motivation behind (2) is to counter the problems listed above. In the original BT algorithm, an inquiring device is unavailable for discovery for long periods of time. By performing inquiry scan for a small fraction of time the device is given a chance to be discovered. Though one might expect that the simple scheme of periodically interrupting inquiry for 18 slots every 2.56 sec will work, there are some considerations based on the factors listed above. In particular, unbounded delays might be caused in case of synchronization. It is later shown, in this document that a device doing randomized inquiry scan within a period of 1.28 sec is ensured to receive an inquiry message from a single inquirer in 5.12 sec.

Implementation of the improved algorithm only requires modifications in the inquiring device. That is, for an inquiring device to advantageously have reduced discovery delays, any associated modifications to any of the other devices with which the inquiring device communicates are unnecessary.

Considering now the algorithm in detail:

All devices which participate in device discovery and are in states other than 'inquiry' go to Inquiry Scan periodically every $T_{inqscan}$ of time for $T_{winqscan}$ period of time.

In the algorithm description, the current value of the device's native clock (expressed in number of slots) is denoted by NOW, and unif(a,b) represents a uniformly distributed integer in the interval [a,b]. The variable 'State' represents the current state of the device. inquiryTO is specified in slots. SlotTime is the duration of a slot.

The command to start inquiry comes from the Host Controller Interface (HCI) with the Max_Responses parameter. The proposed algorithm starts at the receipt of this command:
1. HCI_inquiry command received: prev_state=State. Set Inquiry Timeout timer ($T_{inq}$) for (NOW+inquiryTO). Set timer T1 for (NOW+1.28/SlotTime).
2. Assign State=Inquiry Scan.

Case1: Device receives an inquiry message in 18 slots
3a. Start an inquiry response timer with timeout=inqrespTO, if not already started, and do a random backoff of upto 1023 slots. During backoff goto Inquiry State. After the backoff follow the inquiry response procedure described in the Bluetooth baseband specifications. After inquiry response timer times out, set State=Inquiry.

Case 2: Device does not receive an inquiry message in 18 slots
3b. Assign State=Inquiry.
Timer handler for T1 (called when timer T1 goes off).
(i) Set timer T1 to go off again at (NOW+(1.28/SlotTime)).
(ii) If Inquiry response procedure is not being executed currently, then Set timer T2 to go off at (NOW+unif(0, ((1.28/SlotTime)−18)), and Goto step 3b of the algorithm.
The device will come out of INQUIRY state when timer T2 goes off. If the inquiry response procedure is currently being executed, timer T2 is not scheduled but timer T1 schedules itself to go off after 1.28 sec.

Timer handler for T2 (called when timer T2 goes off)
(i) Goto step 2.
Timer T2 is scheduled by timer T1. Since timer T1 schedules itself every 1.28 sec., it is ensured that handler for timer T2 will be called.

Timer handler for $T_{inq}$ (called when $T_{inq}$ goes off)
(i) State=prev_state.
(ii) Exit Algorithm.

Figure 2:
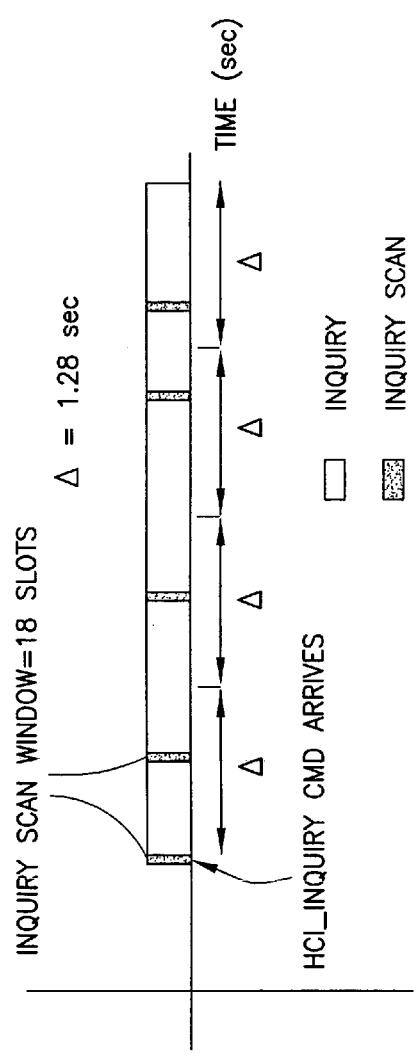
FIG. 2 is a timeline illustrating the effect of an algorithm according to the invention.

The algorithm is illustrated in FIG. 2 for Case 2. The SlotTime is taken to be 625μsec. On the receipt of the HCI_inquiry command the device does not go immediately to Inquiry state but goes to Inquiry scan state for 18 slots. It also sets a timer T1 to go off after Δ=1.28 sec. If no inquiry message is received for the device during this period it goes to Inquiry state and remains there till timer T1 goes off. It now selects a random integer, rand, uniformly distributed between 0 and (2047-18) and sets timer T2 to go off after 'rand' slots. Note that 2047 slots corresponds to 1.28 sec and 18 slots correspond to 11.25 msec of inquiry scan window. When T2 goes off, the state is set to inquiry scan for 18 slots again. Timer T1 goes off every 1.28 sec.

FIGS. 3(a)–(e) shows a graphical representation, based on Specification and Description Language (SDL), of an ad-hoc system using an embodiment of the algorithm of the invention. It should be noted that FIGS. 3(a)–(e) do not represent a complete specification and are only intended to describe the algorithm. In particular, modelling of the Medium block 302, which represents a wireless transmission medium, and the generation of the inquiry message signals (INQ) have not been shown.

Figure 3B:
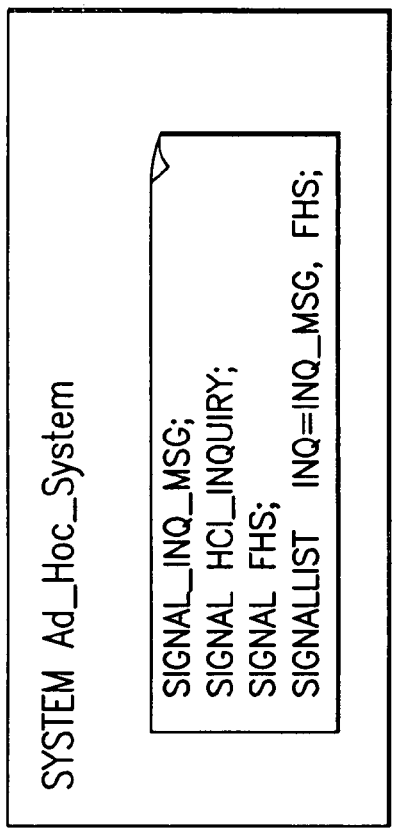
FIGS. 3(a)–(e) show a graphical representation, based on Specification and Description Language (SDL), of an ad-hoc system using the algorithm of the invention.
Figure 3A:
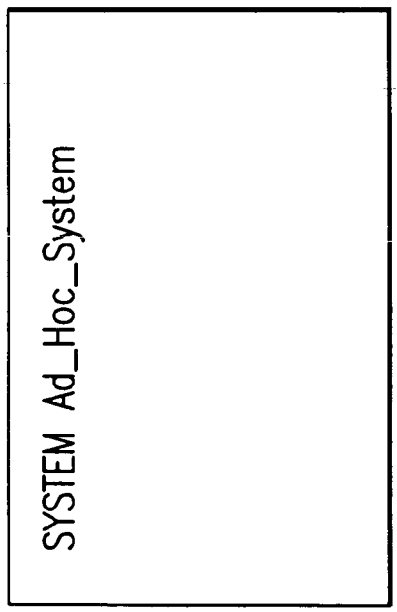

FIG. 3(a) shows the system level agent Ad_Hoc_System.

FIG. 3(b) shows definitions of the signals and signal lists of the system level agent Ad_Hoc_System.

Figure 3C:
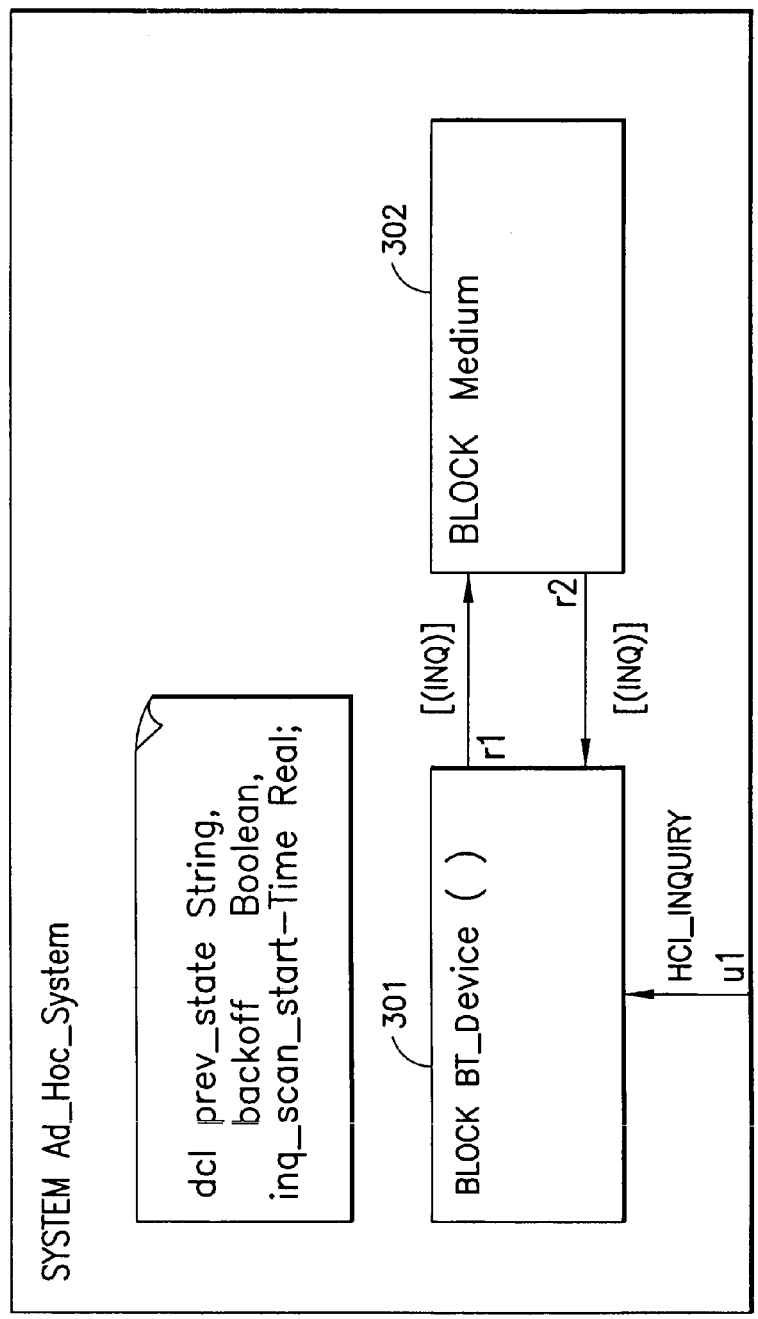

FIG. 3(c) shows system blocks including BT_Device 301 that models a Bluetooth device and Medium 302 that models a wireless transmission medium.

Figure 3D:
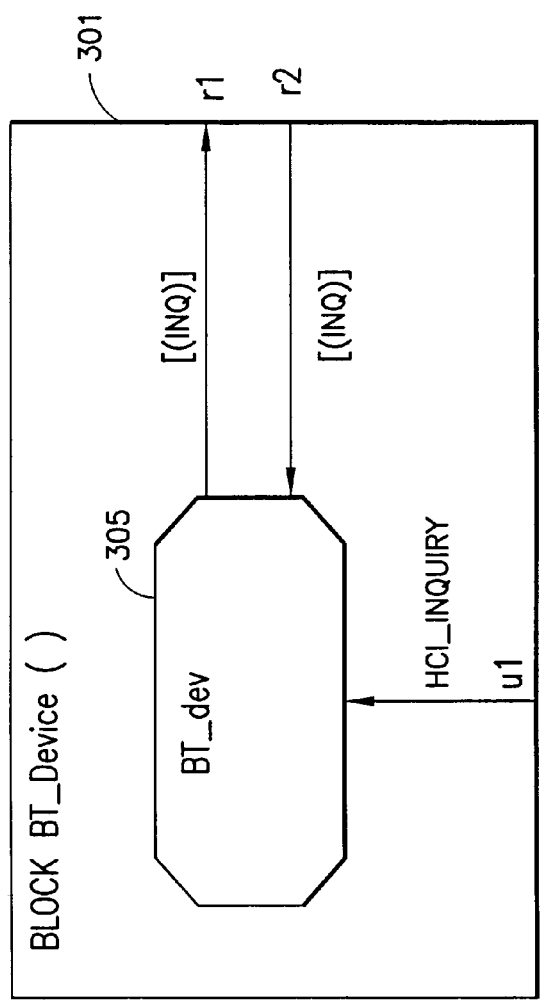

FIG. 3(d) shows the structure of block BT_Device 301, which includes the process BT_dev 305.

Figures 1, 3E:
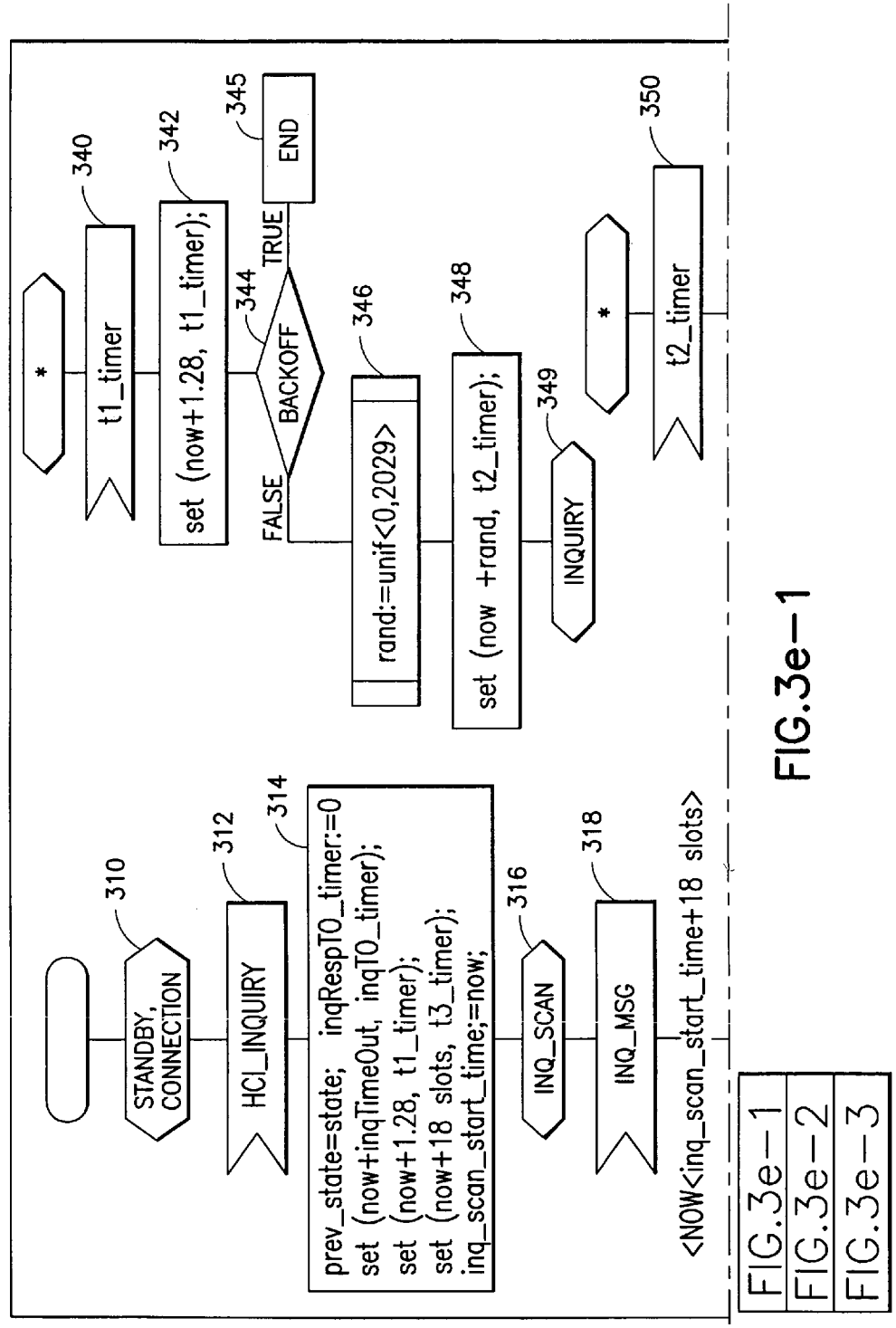
Figures 2, 3E:
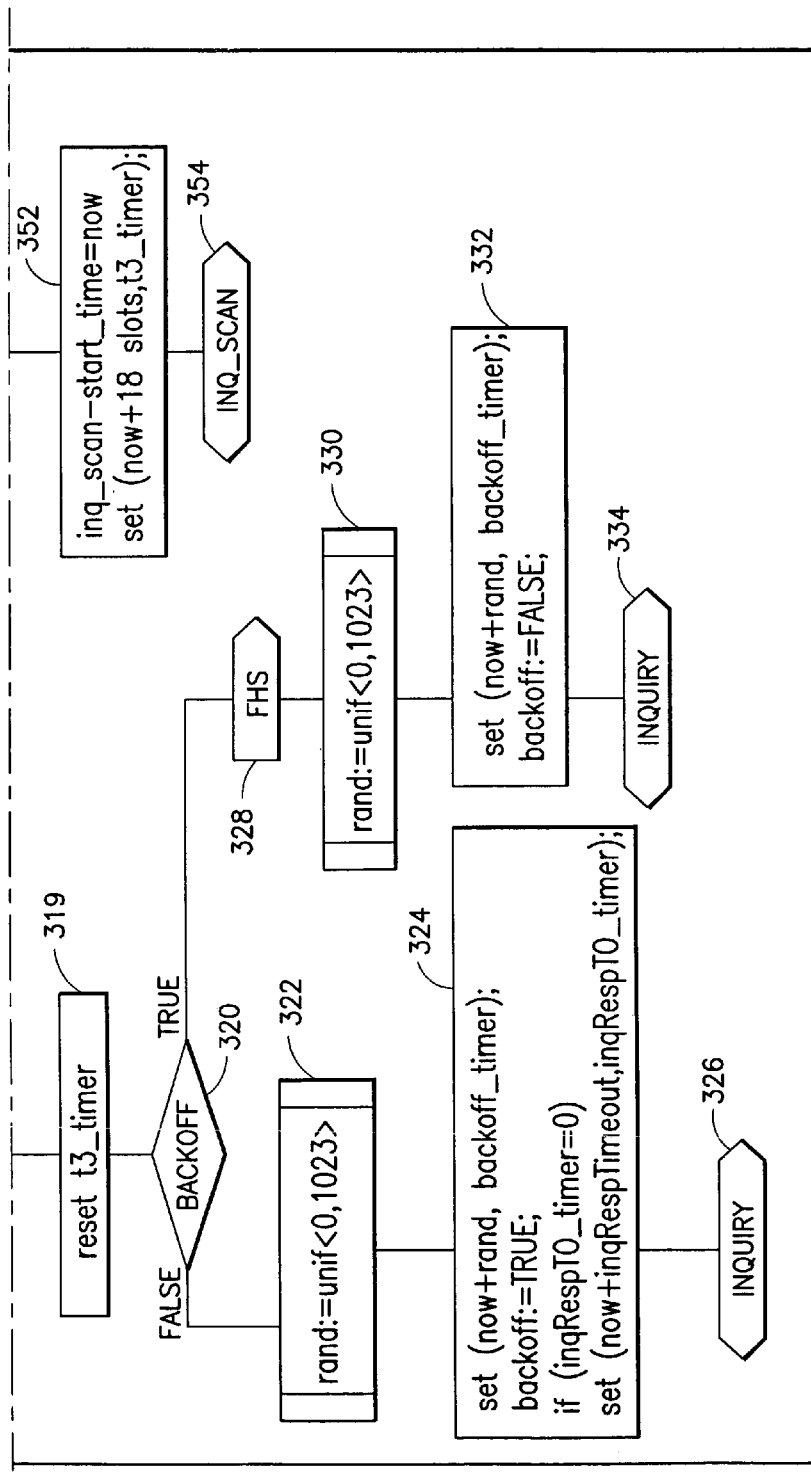
Figures 3, 3E:
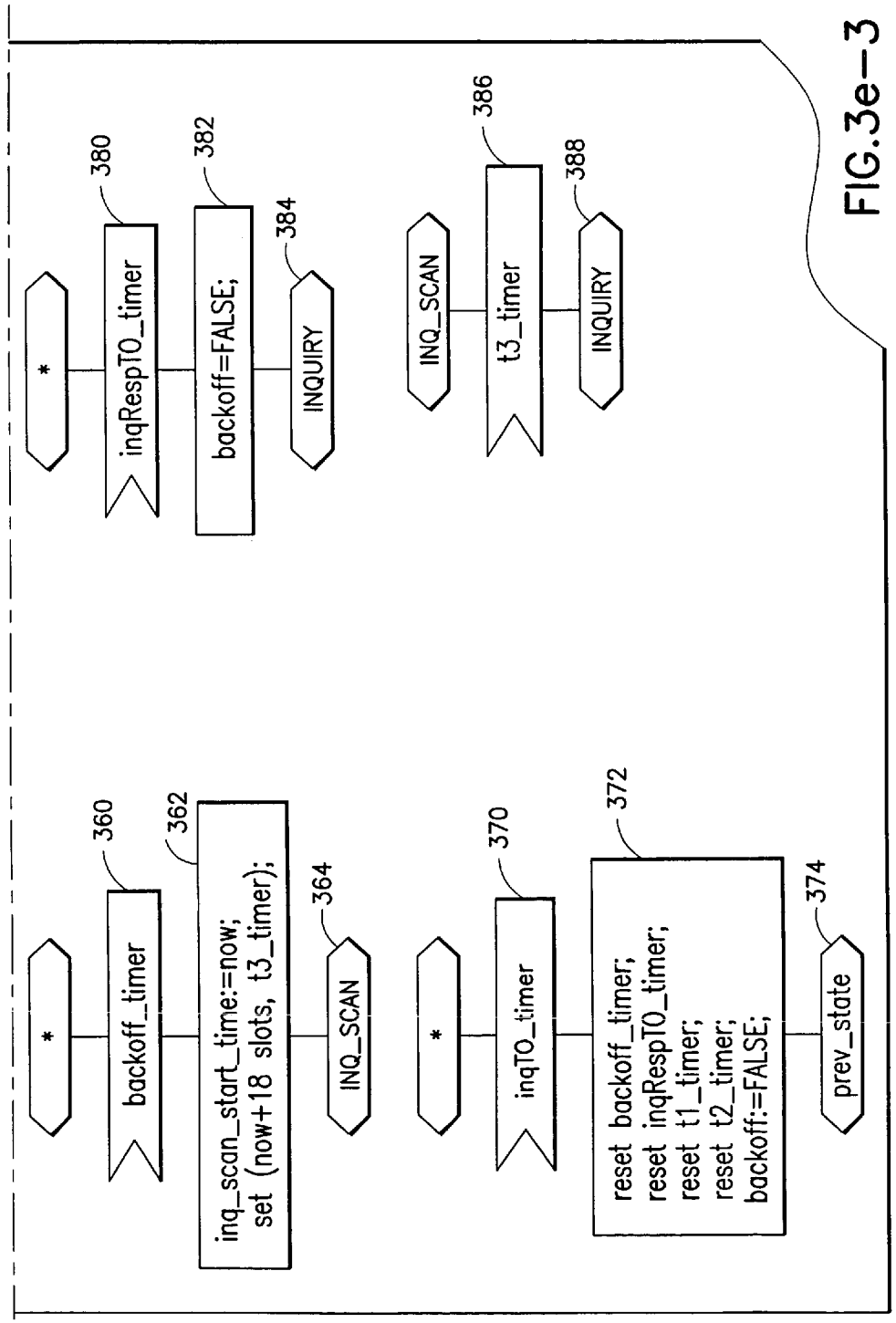

FIG. 3(e) shows the process BT_dev 305 which is an embodiment of the algorithm of the invention. The background-shaded statements are indicative of the modifications to the standard BT algorithm. The process BT_dev 305 includes a main routine and a number of timer handler routines:

Main Routine

Referring to FIG. 3(e), the system remains in a standby connection mode, at step 310, until receipt of an HCI_inquiry command received from a Host Controller Interface at step 312.

At step 314, the current state of the device is stored, the inquiry response timer (inq_RespTO_timer) is reset, the inquiry timeout timer (inqTO_timer) is initialized according to the maximum inquiry duration (inquiryT0), and timer T1 is initialised to 1.28 sec, which is the interval for randomized inquiry scan proposed. The inquiry scan start time is stored and the inquiry scan timer (t3_timer) is set to 18 slots which represents the inquiry scan duration. The inquiry timeout timer (inqTO_timer) is used in the inquiry procedure while the inquiry response timer (inq_RespTO_timer) is used in the inquiry response procedure. Since the proposed algorithm requires an inquiring device to toggle between these two procedures, the two timers can run simultaneously.

Then, the device is set to inquiry scan mode at step 316.

Step 318, and the condition immediately below in angular brackets, represents a constrained trigger for transition in SDL. Thus, if the device is executing inquiry scan (step 316) and an inquiry message is received within 18 slots, then processing proceeds to step 320.

At step 319, the inquiry scan timer (t3_timer) is reset.

The condition of a backoff flag is determined at step 320. If the backoff flag is FALSE, a random variable in the range of 0 to 1023 is generated at step 322.

At step 324, the backoff timer (backoff_timer) is initialised to time the backoff period in accordance with the random variable generated at step 322 and the backoff flag is set TRUE. Further, if the inquiry response timer (inqRespT0_timer) is not already set, then this timer is initialised to time the maximum period for receiving an inquiry response (inqRespTimeout).

Then, at step 326, the device is set to the inquiry mode.

If the backoff flag is TRUE, at step 320, the device sends an FHS packet containing its address and clock information at step 328.

A random variable in the range of 0 to 1023 is generated at step 330.

Then, the backoff timer (backoff_timer) is initialised in accordance with the random value, generated at step 330, and the backoff flag is cleared to FALSE, at step 332.

The device is set to the inquiry mode at step 334.

Timer Handler Routine T1 Steps 340 to 349 represent a handler routine for timer T1, which expires every 1.28 sec. The timer handler is invoked at step 340 upon expiry of timer T1.

At step 342, timer T1 is re-initialised to 1.28 sec, which is the interval for randomized inquiry scan proposed.

If the backoff flag is FALSE, at decision step 344, a random value between 0 and (2047-18) is generated. This value is used to initialise timer T2 at step 348. Note that 2047 slots corresponds to 11.25 msec of inquiry scan window.

At step 349, the device is set to the inquiry mode.

If the backoff flag is TRUE, at decision step 344, the T1 timer handler routine is exited directly, at step 345, without performing steps 346 to 349.

T2 Timer Handler Routine

Steps 350 to 354 represent a timer handler routine for timer T2. The routine is invoked at step 350 when timer T2 expires.

Then, at step 352, the inquiry scan start time is stored and the the inquiry scan timer (t3_timer) is set to 18 slots which represents the inquiry scan duration.

At step 354, the device is set to inquiry scan mode, which will last for 18 time slots.

Backoff Timer Handler Routine

Steps 360 to 364 represent a timer handler routine for the backoff timer. The routine is invoked at step 360 when the backoff timer expires.

Then, at step 362, the inquiry scan start time is stored and the inquiry scan timer (t3_timer) is set to 18 slots which represents the inquiry scan duration.

At step 364, the device is set to inquiry scan mode.

Inquiry Timer Handler Routine

Steps 370 to 374 represent a timer handler routine for the inquiry T0 timer. This timer handler routine is invoked at step 370 when inquiry timer T0 expires.

Then, at step 372 the backoff timer, the inquiry response T0 timer, and the T1 and T2 timers are reset. The backoff flag is also cleared to FALSE.

At step 374, processing returns to the previous state (stored at step 314).

Inquiry Response Timer Handler Routine

Steps 380 to 384 represent a timer handler routine for the inquiry response timer T0.

This timer handler routine is invoked at step 380 when the inquiry response timer expires.

Then, at step 382, the backoff flag is cleared to FALSE. The device is set to inquiry mode at step 384.

Inquiry Scan Timer Handler Routine

Steps 386 to 388 represent a timer handler routine for the inquiry scan timer (t3_timer).

This timer handler routine is invoked at step 386 when the inquiry scan timer expires.

If the timer expires when the device is executing inquiry scan, the device is set to inquiry mode, at step 388.

Comparative Example

What follows is a comparison of the algorithm of the invention against the prior art Bluetooth™ algorithm. In the example there are:

| | |
|---|---|
| Number of devices: | 2–14 |
| Max_Responses | 1–12 |
| Inquiry Timeout: | 10.24 sec. |
| Inquiry Response timeout: | 1 sec. |
| Bandwidth reserved for inquiry: | 10% |
| | (percentage of total time a device spends in inquiry state.) |
| Simulation time: | 10–50 sec. |

Assumptions

1. Error free reception of packets.
2. Negligible propagation delays.
3. Devices participating in device discovery do inquiry scan at least once every 2.56 sec. For BT algorithm however, inquiry state is not interrupted for inquiry scan.
4. All devices considered are in range of each other.
5. All devices reserve 10% bandwidth for doing inquiry.

Performance Metrics

1. Number of Useful Responses per unit time with varying number of devices. Since a device can reply to an inquiry message a number of times only the first (useful) response counts.
2. Inquiry Delay is the average time for which the inquiry procedure lasts. Since the inquiry timeout is specified as 10.24 sec it becomes the upper bound for this delay.

3. Inquiry Timeouts occur if Max_Responses number of responses have not been received within 10.24 sec.

Figure 4:
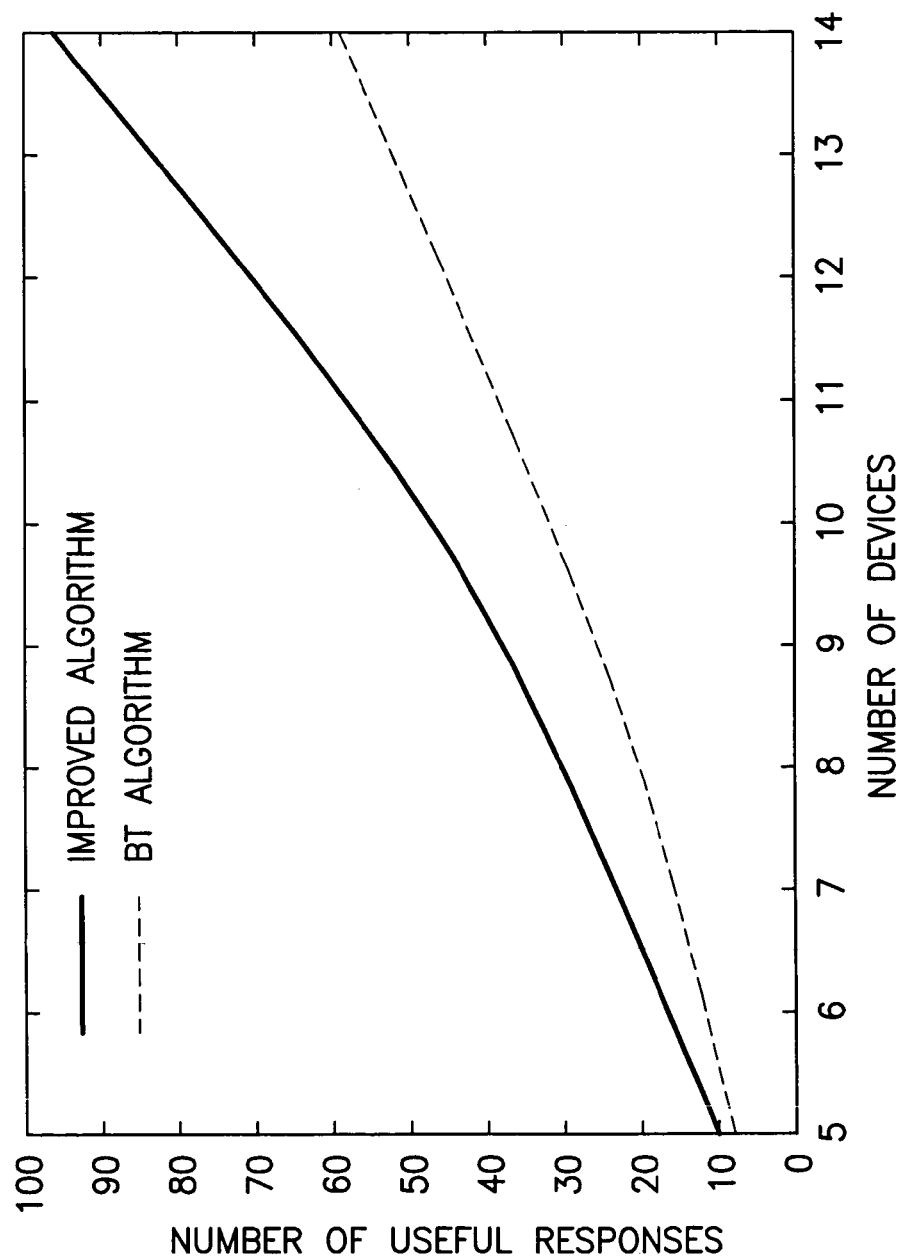
FIGS. 4 to 7 are graphs of the results of comparative testing between the algorithm of the invention and the standard Bluetooth™ algorithm.
Figure 5:
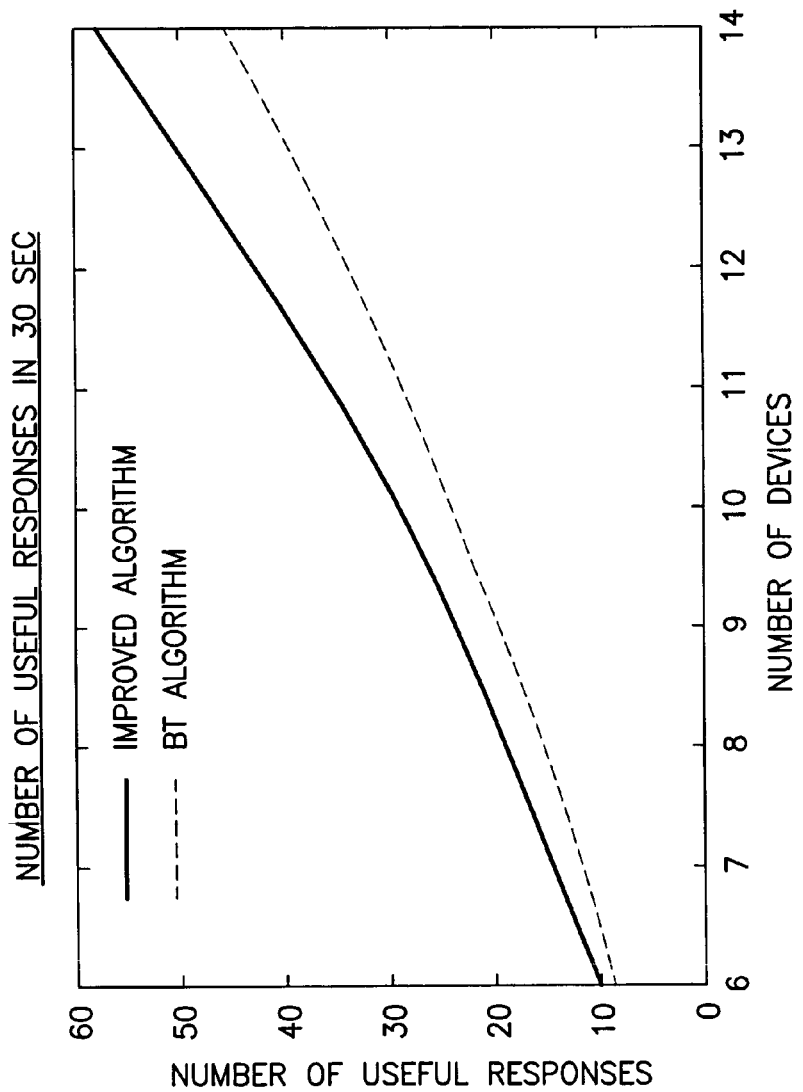
Figure 6:
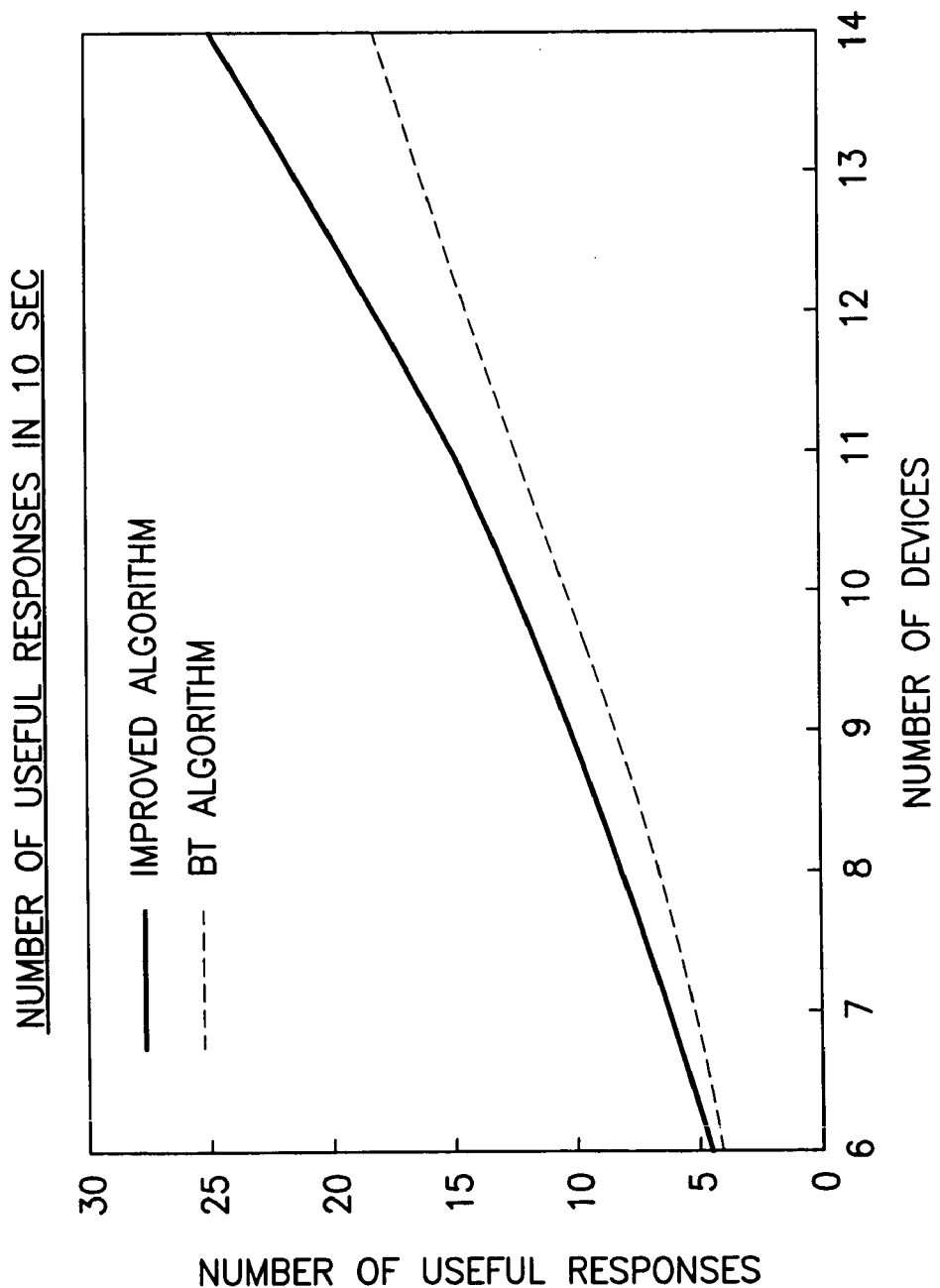

FIGS. 4, 5 and 6 show plots of 'Number of Useful Responses' versus 'Number of Devices' (averaged over 50 test cycles) for the following conditions:

| | FIG. 4 | FIG. 5 | FIG. 6 |
|---|---|---|---|
| Testing Time | 50 sec | 30 sec | 10 sec |

Figure 7:
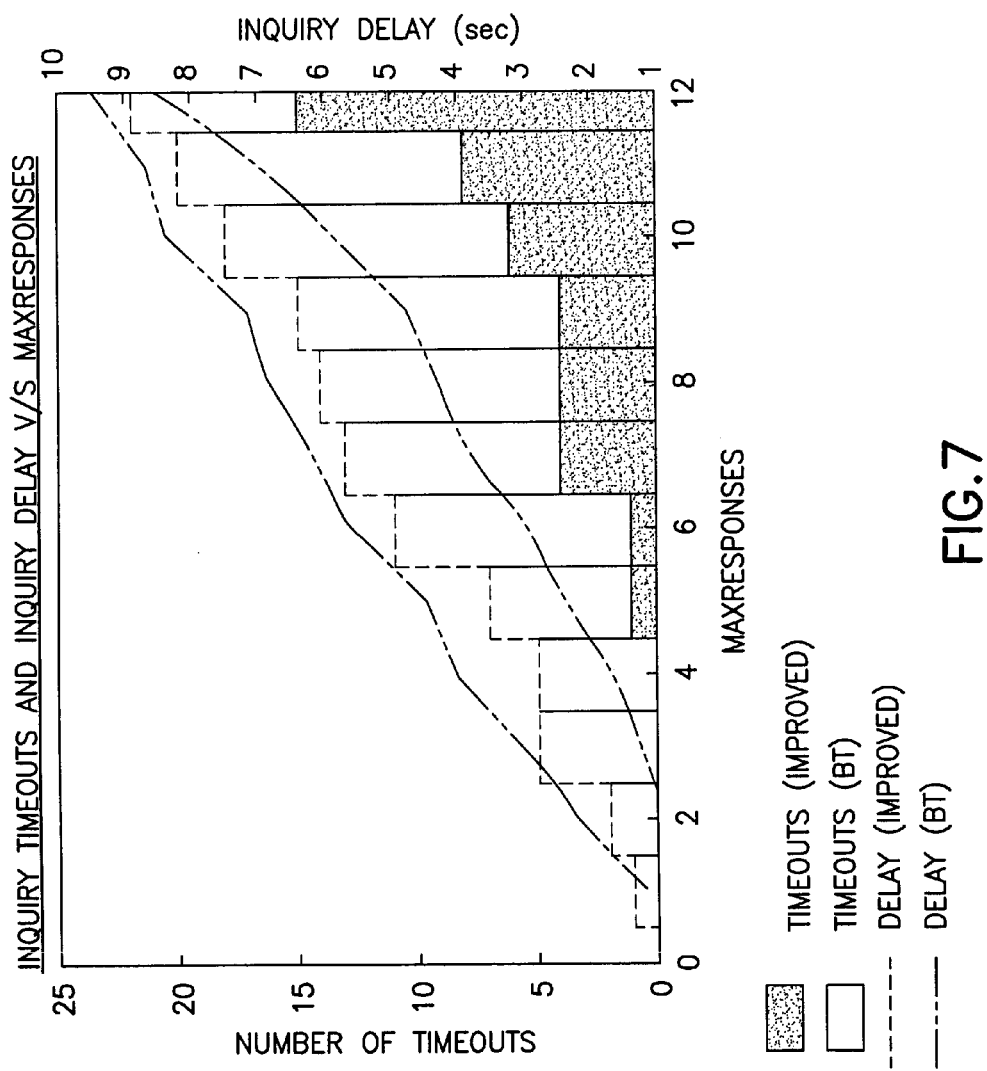

FIG. 7 shows both the number of timeouts and the inquiry delay (average of 34 observations) as a function of the maximum response, where the testing time was 50 sec.

The results show that the proposed algorithm increases the rate of useful responses for the same scenario by up to 60%. For a given number of Max_responses, the inquiry delays and the number of timeouts are seen to be reduced by 50%. Thus the proposed algorithm improves the device discovery delays without adding any complexity. The inputs to the frequency hopping kernel, for all types of hopping sequences remain unchanged. The algorithm thus will reduce the pre-connection overheads for Bluetooth based systems and make more bandwidth available for useful communication.

Necessary Condition for Device Discovery Using Randomized Inquiry Scan

The following derivation shows that any randomized algorithm for inquiry scan should have a period, P, of at most 1.28 sec if the inquiry message has to be received within 5.12 sec.

Figure 8:
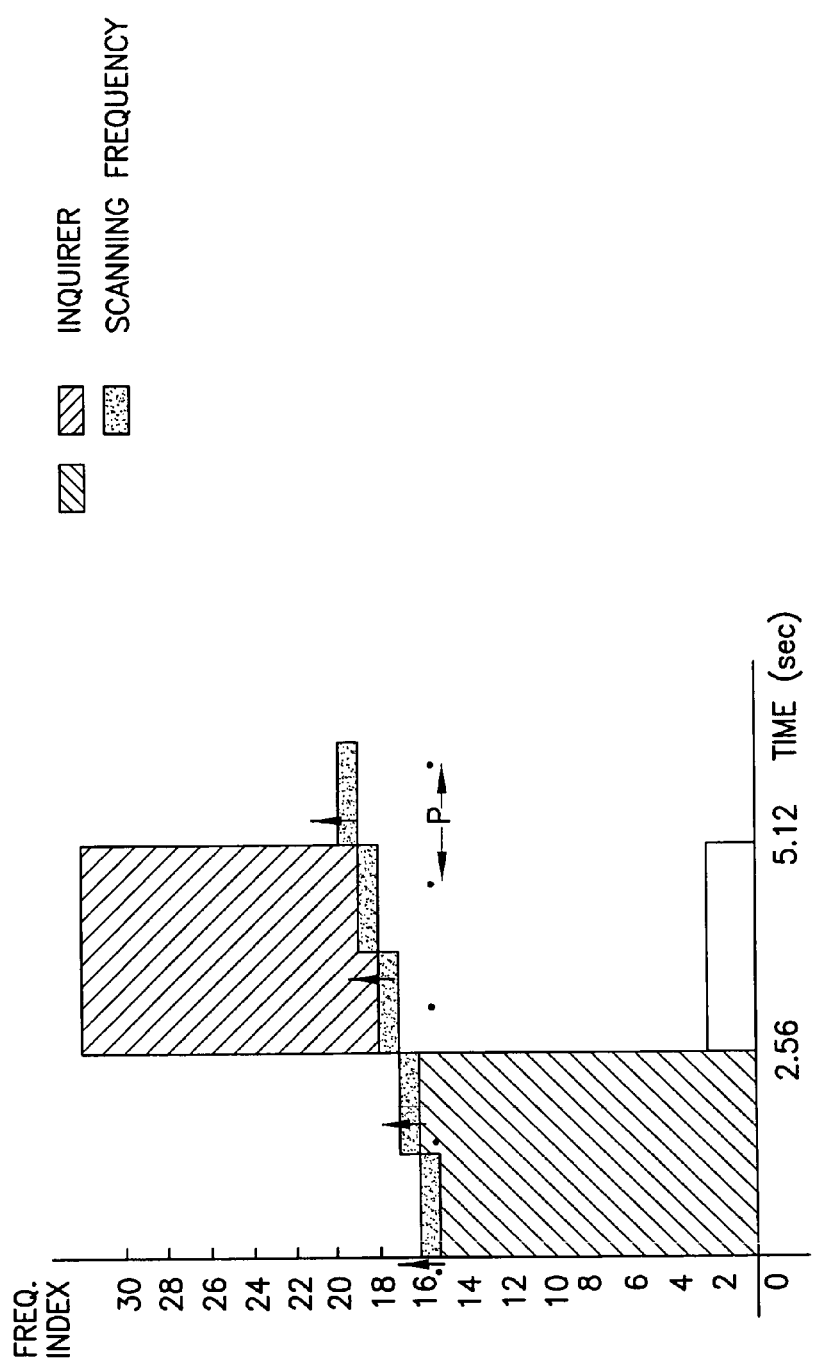
FIG. 8 is a time-frequency diagram for demonstration that a scanning period of greater than 1.28 sec is insufficient to ensure discovery of a device in 5.12 sec, if the start time of the scan is randomly distributed in that period.

The time frequency diagram of FIG. 8 shows the frequencies on which the inquirer is transmitting till time=5.12 sec. The scanning frequency changes every 1.28 sec ($CLKN_{16\text{-}12}$ changes every 1.28 sec) and alternate transitions are assumed to be synchronized with the train switches of the inquiring device. The period of scanning, P, is greater than 1.28 sec as shown. Time is discretized at intervals of 16 slots. The impulses shown are the position of the scanning window within the period P. From the figure it is clear that for this particular case for P>1.28 sec, the devices do not discover each other for more than 5.12 sec.

Thus, it can be seen that the necessary condition for locating the device within 5.12 sec for the randomized algorithm described earlier is P≦1.28 sec. However, in the above example, the $CLKN_{12}$ ticks were assumed to be synchronized with the inquirer's train switch. In the following, this assumption is relaxed and it is proved that P=1.28 sec is sufficient to ensure discovery in 5.12 sec for any starting scanning frequency.

Figure 9:
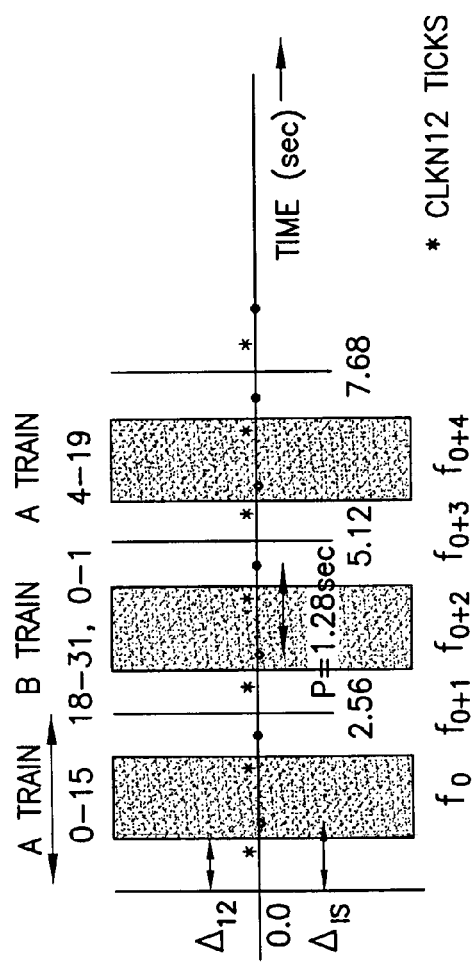
FIG. 9 is a time-frequency diagram for demonstration that a scanning period of 1.28 sec is sufficient to ensure discovery of a device in 5.12 sec, for any starting scanning frequency, if the start time of the scan is randomly distributed in that period.

FIG. 9 shows the most general case. Without loss of generality, it is assumed that the device doing inquiry starts at time t=0 and the frequencies in the first A train are numbered 0–15. Another device starts randomised inquiry scan with period P at time $\Delta_{IS}$. The first $CLKN_{12}$ tick for this device after t=0 occurs at $\Delta_{12}$.

Denoting $\delta = \Delta_{IS} - \Delta_{12}$, it will be shown that for all starting frequencies $f_0$, and for all $\delta$, the scanning device will be discovered within $\Delta_{IS} + 5.12$ sec.

The instants at which the first four inquiry scans i =0,1,2,3 start are given by $$S_i = \Delta_{IS} + i\Delta + t_i \quad \text{(A1)}$$

where $\Delta$ is 1.28 sec and $t_i$ the random time within the P=$\Delta$ window i.e. the interval of $t_i$ is [0, 1.28] sec. The scanning frequency $f_{IS}(t)$ at any time t is given by:

$$f_{IS}(t) = f_0 + \left\lfloor \frac{t - \Delta_{12}}{\Delta} \right\rfloor \quad (A2)$$

Thus the scanning frequencies $F^i_{IS}$, i=0,1,2,3 at the times $S_1$ when scans actually occur are given by:

$$F^i_{IS} = f_0 + \left\lfloor \frac{t_i - i\Delta + \delta}{\Delta} \right\rfloor \quad (A3)$$

The starting frequency for inquiry trains changes every 2.56 sec and is given by:

$$F_{inq}(t) = 2k + 16 \ (k \bmod 2) \quad (A4)$$

where, $$k = \frac{t}{\notin 2\Lambda}$$

Substitution of t=$S_1$ in the above equation yields the starting inquirer frequencies $F^i_{inq}$, i=0, 1,2,3 at the instants when inquiry scans start:

$F^0_{inq}=0$, $\Delta_{IS}+t_0<2\Delta$, $F^0_{inq}=18$, $\Delta_{IS}+t_0>2\Delta$ (A5.1)

$F^1_{inq}=0$, $\Delta_{IS}+t_1<\Delta$, $F^1_{inq}=18$, $\Delta_{IS}+t_1>\Delta$ (A5.2)

$F^2_{inq}=18$, $\Delta_{IS}+t_2<2\Delta$, $F^2_{inq}=4$, $\Delta_{IS}+t_2>\Delta$ (A5.3)

$F^3_{inq}=18$, $\Delta_{IS}+t_3<\Delta$, $F^3_{inq}=4$, $\Delta_{IS}+t_3>\Delta$ (A5.4)

The trains contain frequencies $F^1_{inq}$ to $(F^1_{inq}+15)$ mod 32. The scanning device will be discovered during scan starting at instant $S_1$ if $F^1_{IS}$ is in this range. Now we will show using (A3) and (A5) that for all possible values of $f_0$, $F^1_{IS}$ lies in the above range for at least one value of i=0, 1, 2, 3.

According to definition, Pr(discovery in the i-th scan)=$p_i$.

Case 1: $1 \leq f_0 \leq 14$

From equation (A3), for i=0, $F^1_{IS}=f_0$ or $f_0+1$.

Thus for this case $0 \leq F^0_{IS} \leq 15$.

If $\Delta_{IS}<\Delta$, then $\Delta_{IS}+t_0<2\Delta$, so from equation (A5.1), $F^0_{inq}=0$, and $(F^0_{inq}+15)+15$. Since $F^0_{IS}$ falls in this range, $p_0=1$.

From equation (A3), for i=3, $F^1_{IS}=f_0+3$ or $f_0+4$.

Thus for this case $4 \leq F^3_{IS} \leq 18$.

If $\Delta_{IS}>\Delta$, then $\Delta_{IS}+t_3>\Delta$, so from equation (A5.4), $F^3_{inq}=4$, and $(F^3_{inq}+15)=19$. Since $F^3_{IS}$ falls in this range, $p_3=1$.

Case 2: $17<f_0<30$

From equation (A3), for i=2, $F^1_{IS}=f_0+2$ or $f_0+3$.

For this, the range $F^2_{IS}$ is 19–31, 0–1.

If $\Delta_{IS}<\Delta$, then $\Delta_{IS}+t_2<2\Delta$, so from equation (A5.3), $F^2_{inq}=18$, and $(F^2_{inq}+15)$mod 32=1.

Since $F^2_{IS}$ falls in this range, $p_2=1$.

From equation (A3) for i=1, $F^1_{IS}=f_0+1$ or $f_0+2$.

For this, the range $F^1_{IS}$ is 18–31, 0.

If $\Delta_{IS}>\Delta$, then $\Delta_{IS}+t_1>\Delta$, so from equation (A5.4), $F^1_{inq}=18$, and $(F^1_{inq}+15)$mod 32=1.

Since $F^1_{IS}$ falls in this range, $p_1=1$.

Case 3: $f_0=0, 31, 16, 15$.

For $f_0=0$, $f_0$ and $f_0+1$ are overlap frequencies between first A and first B train, hence $p_0=1$.

For $f_0=31$, $(f_0+1)$mod32 and $(f_0+2)$mod32 are overlap frequencies between first A and first B train, hence $p_1=1$.

For $f_0=16$, $f_0+2$ and $f_0+3$ are overlap frequencies between first B and second A train, hence $p_2=1$.

Implementation

Figure 10:
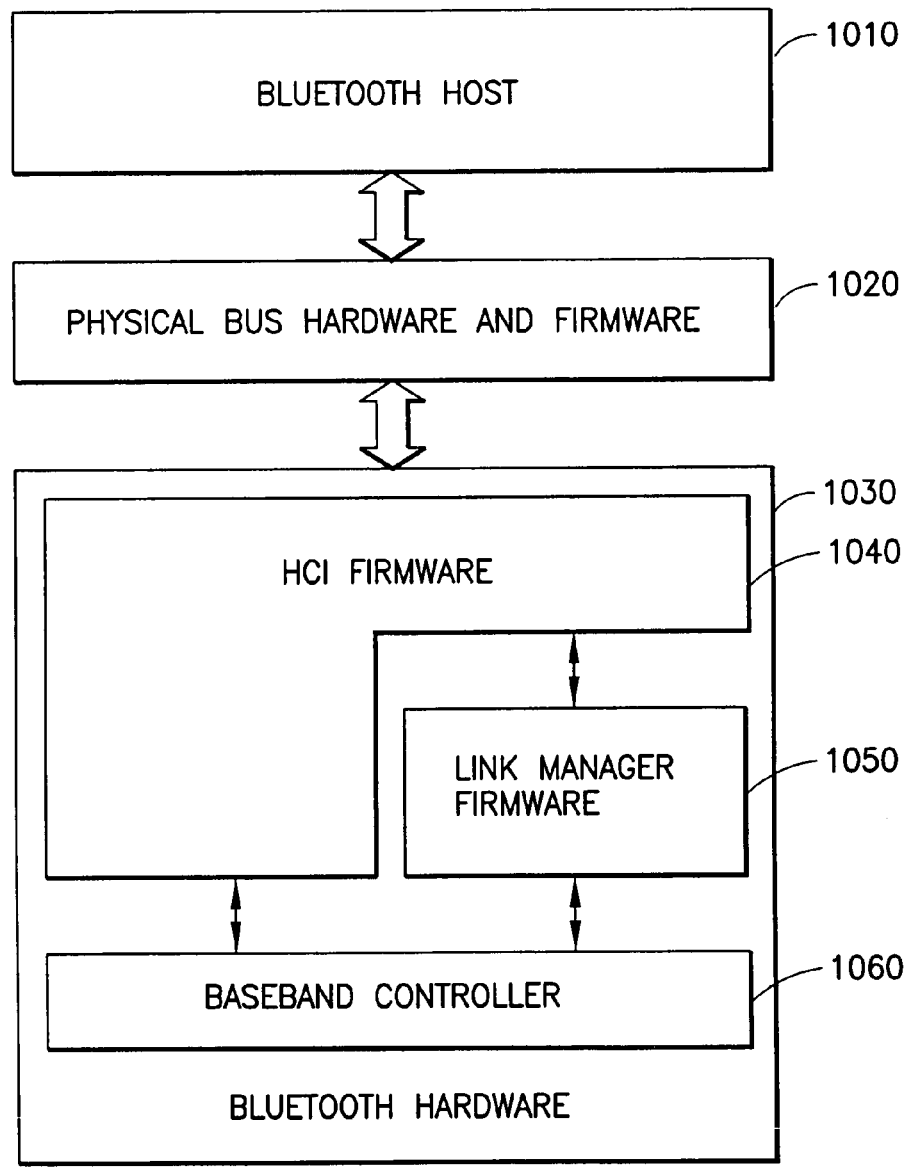
FIG. 10 shows a block diagram of an exemplary Bluetooth™ device in which the algorithm of the invention may be implemented.

FIG. 10 includes a block diagram of an exemplary Bluetooth™ device 1030, showing lower software layers. The host controller interface firmware 1040 provides a means of accessing the Bluetooth™ baseband capabilities from the Bluetooth™ host 1010 via the physical bus hardware and firmware 1020. The algorithm of the invention is implemented in the link manager firmware 1050. The host controller interface firmware 1040 does not require modification for the invention to be implemented.

The foregoing describes only a few arrangements and embodiments of the invention, and modifications and/or changes can be made thereto without departing from the scope and spirit of the invention, the arrangements and embodiments being illustrative and not restrictive.

We claim:

1. A method for reducing device discovery delays in frequency hopping based ad-hoc networks, said method comprising:
   periodically interrupting an activity being executed by a device to scan, for a pre-determined time period, for inquiry messages from other devices irrespective of which state of activity said other devices are in in between inquiry scans of said other devices, wherein said periodic interruption of an activity occurs at least once every periodic cycle, and wherein a scanning frequency of said inquiry scans changes every said periodic cycle;
   returning to continue said activity for a random time period on receipt of an inquiry message from another device and, upon expiry of said random time period, processing said inquiry message in accordance with normal procedures applicable to the particular frequency hopping based ad-hoc network when said devices to scan are not found, wherein said random time period to continue said interrupting activity, before processing said inquiry message received from another device, is constrained to be less than or equal to half of said periodic cycle, and wherein receipt of said inquiry message from said another device must occur in a time period equal to no greater than twice said periodic cycle for any starting said scanning frequency; and
   returning to continue said activity on expiry of said pre-determined time period when said devices to scan are found.

2. The method of claim 1, wherein said pre-determined time period for scanning is reduced by the reception, by said device, of a pre-determined number of inquiry messages from other devices.

3. The method of claim 1, wherein said interrupting activity is one of device discovery.

4. The method of claim 1, wherein said frequency hopping based ad-hoc network is implemented under the Bluetooth™ defacto standard.

5. The method of claim 4, wherein said interrupting activity is one of device discovery.

6. The method of claim 4, wherein said periodic interruption of an activity occurs at least once every 2.56 seconds.

7. The method of claim 6, wherein said random time period to continue said interrupting activity, before processing said inquiry message received from another device, is constrained to be less than or equal to 1.28 seconds.

8. A device for use in frequency hopping based ad-hoc networks including:
a processor adapted to periodically interrupt an activity being executed by a device to scan, for a pre-determined time period, for inquiry messages from other devices irrespective of which state of activity said other devices are in in between inquiry scans of said other devices, wherein said periodic interruption of an activity occurs at least once every periodic cycle, and wherein a scanning frequency of said inquiry scans changes every said periodic cycle;
wherein said processor is adapted to return to continue said activity for a random time period on receipt of an inquiry message from another device and, upon expiry of said random time period, processing said inquiry message in accordance with normal procedures applicable to the particular frequency hopping based ad-hoc network when said devices to scan are not found, wherein said random time period to continue said interrupting activity, before processing said inquiry message received from another device, is constrained to be less than or equal to half of said periodic cycle, and wherein receipt of said inquiry message from said another device must occur in a time period equal to no greater than twice said periodic cycle for any starting said scanning frequency; and
wherein said processor is adapted to return to continue said activity on expiry of said pre-determined time period when said devices to seen are found.

9. The device of claim 8, wherein said pre-determined time period for scanning is reduced by the reception, by said device, of a pre-determined number of inquiry messages from other devices.

10. The device of claim 8, wherein said interrupting activity is one of device discovery.

11. The device of claim 8, wherein said frequency hopping based ad-hoc network is implemented under the Bluetooth™ defacto standard.

12. The device of claim 11, wherein said interrupting activity is one of device discovery.

13. The device of claim 11, wherein said periodic interruption of an activity occurs at least once every 2.56 seconds.

14. The device of claim 13, wherein said random time period to continue said interrupting activity, before processing said inquiry message received from another device, is constrained to be less than or equal to 1.28 seconds.

15. A computer program product incorporating a computer readable medium having a computer program recorded therein for implementing a method for reducing device discovery delays in frequency hopping based ad-hoc networks, said method comprising:
periodically interrupting an activity being executed by a device to scan, for a pre-determined time period, for inquiry messages from other devices irrespective of which state of activity said other devices are in in between inquiry scans of said other devices, wherein said periodic interruption of an activity occurs at least once every periodic cycle, and wherein a scanning frequency of said inquiry scans changes every said periodic cycle;
returning to continue said activity for a random time period on receipt of an inquiry message from another device and, upon expiry of said random time period, processing said inquiry message in accordance with normal procedures applicable to the particular frequency hopping based ad-hoc network when said devices to scan are not found, wherein said random time period to continue said interrupting activity, before processing said inquiry message received from another device, is constrained to be less than or equal to half of said periodic cycle, and wherein receipt of said inquiry message from said another device must occur in a time period equal to no greater than twice said periodic cycle for any starting said scanning frequency; and
returning to continue said activity on expiry of said pre-determined time period when said devices to scan are found.

16. The computer program product of claim 15, wherein said pie-determined time period for scanning is reduced by the reception, by said device, of a pre-determined number of inquiry messages from other devices.

17. The computer program product of claim 15, wherein said interrupting activity is one of device discovery.

18. The computer program product of claim 15, wherein said frequency hopping based ad-hoc network is implemented under the Bluetooth™ defacto standard.

19. The computer program product of claim 18, wherein said interrupting activity is one of device discovery.

20. The computer program product of claim 18, wherein said periodic interruption of an activity occurs at least once every 2.56 seconds.

21. The computer program product of claim 20, wherein said random time period to continue said interrupting activity, before processing said inquiry message received from another device, is constrained to be less than or equal to 1.28 seconds.

* * * * *